United States Patent [19]

Thomas et al.

[11] 4,110,302

[45] Aug. 29, 1978

[54] REINFORCED POLYCARBODIIMIDE MODIFIED POLYALKYLENE TEREPHTHALATE

[75] Inventors: Norman W. Thomas, Warren; Frank M. Berardinelli, Millington, both of N.J.; Robert Edelman, Staten Island, N.Y.

[73] Assignee: Celanese Corporation, New York, N.Y.

[21] Appl. No.: 775,124

[22] Filed: Mar. 7, 1977

Related U.S. Application Data

[63] Continuation-in-part of Ser. No. 616,348, Sep. 24, 1975, abandoned.

[51] Int. Cl.$^2$ .................... C08G 63/46; C08G 63/76
[52] U.S. Cl. ................................ 260/40 R; 260/860; 528/273
[58] Field of Search ................ 260/75 T, 75 N, 860, 260/40 R

[56] References Cited

U.S. PATENT DOCUMENTS

| 3,193,522 | 7/1965 | Neumann et al. | 260/45.9 |
| 3,764,576 | 10/1973 | Russo | 260/40 R |
| 3,814,725 | 6/1974 | Zimmerman et al. | 260/40 R |
| 3,975,329 | 8/1976 | Barnewall et al. | 260/75 T |

FOREIGN PATENT DOCUMENTS 1,373,278  11/1974  United Kingdom.

*Primary Examiner*—Sandra M. Person

[57] ABSTRACT

Molding resin compositions comprising a polycarbodiimide modified polyalkylene terephthalate polymer (polypropylene terephthalate, polybutylene terephthalate, or mixtures thereof) and a reinforcing agent such as glass fibers have been found to exhibit improved impact strength and thus are useful in various molding applications in order to prepare articles of manufacture having, e.g., industrial (e.g., gears, bearings), automotive (e.g., automotive distributor caps, distributor rotors), and electrical (e.g., motor end caps, brush holders) applications. These molding resin compositions are particularly useful in certain automotive, industrial, and electrical applications where greater impact strength may be required to extend the useful life of various articles of manufacture which may be subjected to occasional or continuous shock or impact.

These molding resin compositions may be prepared by intimately admixing in the molten state a reinforcing agent such as glass fibers with a polycarbodiimide modified polyalkylene terephthalate polymer formed from the reaction between a polyalkylene terephthalate polymer which is the reaction product of terephthalic acid or a dialkyl ester of terephthalic acid and a glycol selected from the group consisting of trimethylene glycol, tetramethylene glycol, and mixtures thereof, and a polycarbodiimide which is both (1) derived from at least one aromatic diisocyanate which is either unsubstituted or contains up to one methyl substituent on each aromatic ring, and (2) contains at least two carbodiimide units per polycarbodiimide molecule. The components of the composition are preferably prepared by charging the polyalkylene terephthalate to the hopper of a melt screw extruder and adding the polycarbodiimide and reinforcing agent downstream in the extruder-e.g., in the vent port or other side feed port of the extruder.

19 Claims, No Drawings

REINFORCED POLYCARBODIIMIDE MODIFIED POLYALKYLENE TEREPHTHALATE

CROSS-REFERENCE TO RELATED APPLICATION

This application is a continuation-in-part application of our co-pending application Ser. No. 616,348, filed Sept. 24, 1975 and now abandoned.

BACKGROUND OF THE INVENTION

1. Field of the Invention

The present invention relates generally to reinforced molding resins. More particularly, this invention describes reinforced polycarbodiimide modified polyalkylene terephthalate molding resin compositions.

2. Summary of the Prior Art

Polyethylene terephthalate, polypropylene terephthalate, and polybutylene terephthalate resins were first disclosed in U.S. Pat. No. 2,465,319 to Whinfield and Dickson.

Recent investigations with reinforced polypropylene terephthalate and polybutylene terephthalate molding resins have indicated that they are surprisingly superior to similarly reinforced polyethylene terephthalate in many important processing and performance characteristics. For example, polypropylene terephthalate and polybutylene terephthalate may be molded and processed at lower temperatures, have a shorter cycle time in the mold, and do not require, as does polyethylene terephthalate, the presence of either a nucleating agent or an internal mold release agent. Furthermore, reinforced polypropylene terephthalate and polybutylene terephthalate molding resins have correspondingly higher tensile strength, lower water absorption and better creep (flexural) properties than does similarly reinforced polyethylene terephthalate.

As a direct result, these polypropylene terephthalate and polybutylene terephthalate molding resins have been found to solve processing problems long associated with polyethylene terephthalate and believed by those skilled in the art to be equally associated with all polyalkylene terephthalates. Equally as significant, these molding resins present a noticeably improved balance of performance properties which those skilled in the art did not believe to exist as evidenced by the extensive use of polyethylene terephthalate molding resins to the almost total exclusion of other polyalkylene terephthalates.

Consequently, the superior processing requirements and physical properties of the polypropylene terephthalate and polybutylene terephthalate molding resins makes them more commercially desirable, with a wider area of applicability than polyethylene terephthalate.

Reinforced polypropylene terephthalate and polybutylene terephthalate resins are also well known in the art. For example, U.S. Pat. No. 3,814,725, which is assigned to the assignee of the present invention, discloses improved thermoplastic polyester molding resins comprising a reinforcing filler and a polypropylene terephthalate or a polybutylene terephthalate polymer. These molding resins have filled a long existing need in providing outstanding molding processing advantages combined with outstanding physical properties of the molded articles. U.S. Pat. Nos. 3,751,396 and 3,783,349, also assigned to the assignee of the present invention, disclose flame retardant reinforced polybutylene terephthalate or polypropylene terephthalate polymers with similar processing advantages and property advantages as those thermoplastic molding resins described in U.S. Pat. No. 3,814,725.

It is also known to add carbodiimides to polyesters for various purposes. See, e.g., U.S. Pat. Nos. 3,193,522; 3,193,523; 3,193,524; and 3,835,098. For example, U.S. Pat. No. 3,193,522 discloses a process for stabilizing polyesters against hydrolytic degradation by adding polycarbodiimides to the polyesters. The polycarbodiimides must have a molecular weight of at least 500 and have more than three carbodiimide groups in the molecule with the provision that at least one carbodiimide group be present for each molecular weight unit of 1500. The polycarbodiimides may be aliphatic, aromatic, unsubstituted, or highly substituted. In that patent, there is no disclosure or suggestion that the use of any particular polycarbodiimides of the broad class disclosed will increase the impact strength of reinforced polyesters necessary in order to render them useful for certain molding applications, especially in molding articles of manufacture for certain automotive, industrial, or electrical applications where increased impact strength may extend the life of such articles.

Also, U.S. Pat. Nos. 3,193,523 and 3,193,524 disclose the use of monocarbodiimides to stabilize polyesters. Furthermore, U.S. Pat. No. 3,835,098 discloses the reaction of intermediate molecular weight thermoplastic elastomeric copolyesters with minor amounts of a polycarbodiimide in order to provide compositions which exhibit properties similar to those exhibited by copolyesters having a higher degree of polymerization.

Co-pending U.S. patent application Ser. No. 715,946 (N. W. Thomas, F. M. Berardinelli, and R. Edelman), which was filed on Aug. 19, 1976, and is assigned to the assignee of the present invention, generically discloses and claims a process for preparing certain polycarbodiimide modified thermoplastic polyesters. The modified thermoplastic polyesters have increased melt strength and are suitable for extrusion applications. This process comprises incorporating into the structure of a thermoplastic saturated polyester having at least one carboxyl end group, at least one polycarbodiimide which polycarbodiimide both (a) is derived from at least one aromatic diisocyanate which is either unsubstituted or contains up to one methyl substituent on each aromatic ring, and (b) contains at least three carbodiimide units per polycarbodiimide molecule by reacting the carboxyl end group of the polyester while in the molten state with the carbodiimide group of the polycarbodiimide.

The resulting polycarbodiimide modified thermoplastic polyesters have increased melt strength and intrinsic viscosity and a decreased number of carboxylic acid end groups. These improved melt strength polyesters also have improved die swell characteristics and are useful in extrusion applications such as blow molding.

Co-pending U.S. patent application Ser. No. 768,528, now U.S. Pat. No. 4,052,360, entitled "Reinforced Flame Retardant Polyester Composition Having Non-Drip Characteristics," (F. M. Berardinelli and R. Edelman), which was filed on Feb. 14, 1977, and which is also assigned to the assignee of the present invention, discloses and claims a process for preparing a reinforced flame retardant copolyester molding resin composition having non-drip characteristics. This process comprises intimately mixing A) at least one reinforcing agent B) at least one Group Vb metal-containing compound, and C) the molten reaction product of
   (a) at least one alkane diol having from two to six carbon atoms selected from the group consisting of ethylene glycol, 1,3-propane diol, 1,4-butane diol, 1,5-pentane diol, and 1,6-hexane diol,
   (b) terephthalic acid, isophthalic acid, or a dialkyl ester thereof wherein the alkyl radical contains from 1 to 7 carbon atoms, and
   (c) a halogenated derivative of the bishydroxyethylether of p,p'-isopropylidenediphenol, having the formula

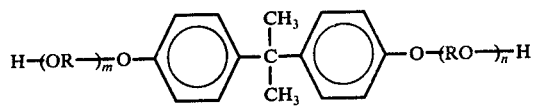

wherein the aromatic nuclei of the p,p'-isopropylidenediphenol are substituted with from one to four halogen atoms, R is a bivalent hydrocarbon radical containing from 2 to 6 carbon atoms, m and n are integers from 1 to 10, and the halogenated derivative of the bishydroxyethylether of p,p'-isopropylidenediphenol comprises from about 8 to about 40% by weight of the copolyester composition, and (2) at least one polycarbodiimide, which polycarbodiimide both
   (a) is derived from at least one aromatic diisocyanate which is either unsubstituted or contains up to one methyl substituent on each aromatic ring, and
   (b) contains at least three carbodiimide units per polycarbodiimide molecule, whereby the resulting reinforced copolyester molding resin composition is flame retardant and exhibits non-drip characteristics.

However, none of these patents or patent applications which disclose stabilizing or otherwise modifying polyesters by reacting them with carbodiimides, suggests that the resulting modified polyesters have the improved impact strength necessary in order to be useful for certain molding applications, especially in molding articles of manufacture for certain automotive, industrial, or electrical applications where increased impact strength may extend the life of such articles which may be subjected to occasional or continuous shock or impact.

OBJECTS AND SUMMARY OF THE INVENTION

Accordingly, a general object of the present invention is to avoid or substantially alleviate the above problems of the prior art.

A more specific object of the present invention is to provide a process for preparing reinforced polyester compositions having improved impact strength.

Another object of the present invention is to provide a process for preparing reinforced polyester compositions useful in molding applications.

A further object of the present invention is to provide the reinforced polyester compositions prepared by these processes.

Other objects and advantages of the invention will become apparent from the following summary and description of the preferred embodiments of the present invention.

In one aspect, the present invention provides a process for producing a reinforced polyalkylene terephthalate molding resin composition comprising intimately mixing in the molten state a reinforcing agent with a polyalkylene terephthalate polymer which is the reaction product of terephthalic acid or a dialkyl ester of terephthalic acid and a glycol selected from the group consisting of trimethylene glycol, tetramethylene glycol, and mixtures thereof, the polyalkylene terephthalate having an intrinsic viscosity of from about 0.2 to about 1.2 deciliters per gram, the improvement comprising modifying the polyalkylene terephthalate polymer by reacting the polyalkylene terephthalate polymer in the molten state with at least one polycarbodiimide, which polycarbodiimide both
   (a) is derived from at least one aromatic diisocyanate which is either unsubstituted or contains up to one methyl substituent on each aromatic ring, and
   (b) contains at least two carbodiimide units per polycarbodiimide molecule whereby the resulting molding resin composition exhibits a substantially improved impact strength.

In another aspect, the present invention provides the reinforced polycarbodiimide modified polyalkylene terephthalate molding resins produced by this process.

The essence of the present invention is the discovery that a limited group of polycarbodiimides will react with polyalkylene terephthalate polymers such that these polycarbodiimide modified polyalkylene terephthalate polymers when intimately admixed with a reinforcing agent such as glass fibers have improved impact strength over reinforced polyalkylene terephthalate polymers which are not so modified.

DESCRIPTION OF THE PREFERRED EMBODIMENTS

As indicated hereinabove, the process of the present invention comprises reacting a polyalkylene terephthalate polymer, while in the molten state, with a polycarbodiimide, and intimately admixing therewith a reinforcing agent.

The polyalkylene terephthalate polymers useful in the present invention may be produced in any way known to those having ordinary skill in this art, e.g., they may be produced from the reaction of terephthalic acid or a dialkyl ester of terephthalic acid (especially dimethyl terephthalate) and glycols having 3 or 4 carbon atoms, such as trimethylene glycol, i.e., 1,3-propylene glycol, and butylene glycol, i.e., 1,4-tetramethylene glycol. The polymers as used may have an intrinsic viscosity in the range of from about 0.2 to about 1.2 deciliters per gram and a preferred intrinsic viscosity of from about 0.5 to about 1.0 deciliters per gram. The intrinsic viscosity is measured in a standard way utilizing an 8% by weight polymer solution in ortho-chlorophenol at 25° C.

Included in the definition of polybutylene terephthalate polymers or polypropylene terephthalate polymers are those polymers containing a halogenated (preferably brominated) aromatic compound incorporated in the polymer structure as co- or terpolymers. Halogenated aromatic compounds containing polyfunctional hydroxyl or acid units which may be copolymerized with the polyalkylene terephthalates are suitable. A highly desirable compound for this purpose is 2,2-bis[3,5-dibromo-4-(2-hydroxyethoxy)phenyl]propane.

These terpolymers may be used as a basis for flame retardant reinforced molding resins in the presence of a minor amount of a metal containing compound wherein the metal is selected from the group consisting of arsenic, antimony, bismuth and phosphorus.

The flame retardant molding resins of this invention may be produced by utilizing compositions as described in Canadian Pat. No. 945,698, which is assigned to the assignee of the present invention. This process may be carried out by intimately mixing the polyalkylene terephthalate polymers with the combination of an aromatic halide and a group Vb metal (as defined in the Periodic Table of the Elements found in the end cover of Advanced Inorganic Chemistry, Cotton and Wilkinson (2d. ed. 1967)) containing compound. In a preferred embodiment, the aromatic halide may be present at from about 3.3 to about 16% by weight, based on the weight of the resin, calculated as halide, and the group Vb metal containing compound may be present at from about 0.7 to about 10.0% by weight, based on the weight of the resin, calculated as the group Vb metal. In addition, the weight ratio of available halide in the aromatic halide to available group Vb metal containing compound may be from about 0.3 to about 4. In a particularly preferred embodiment of the present invention, this weight ratio may be from about 0.46 to about 2.

It is known that aromatic halides, when used in conjunction with a Group Vb metal containing compound, effectively reduce the burning properties of reinforced polypropylene terephthalate and polybutylene terephthalate.

Specific aromatic halides which may be used are selected from the following groups:

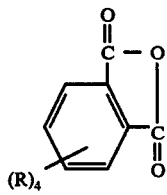

(I)

wherein R may represent either a hydrogen, chlorine, or bromine atom, with at least one, and preferably at least two, chlorine or at least two bromine atoms on the aromatic ring. Examples of Group I aromatic halides include tetrabromophthalic anhydride, tetrachlorophthalic anhydride, and the like.

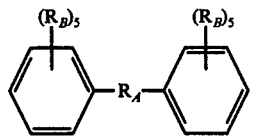

(II)

wherein $R_A$ may represent either oxygen, sulfur, sulfur dioxide, methylene or a phosphonate; and each $R_B$ may represent either a hydrogen, chlorine, or bromine atom, with at least one, and preferably at least two, chlorine or at least two bromine atoms on each aromatic ring.

Examples of Group II aromatic halides include 3,5,3',5'-tetrabromobiphenyl ether, 3,5,3',5'-tetrachlorobiphenyl sulfide, 3,5-dichloro-3',5'-dibromo biphenylsulfoxide, 2,4-dichloro-3',4',5'-tribromobiphenylmethane, decabromodiphenyl ether, and the like.

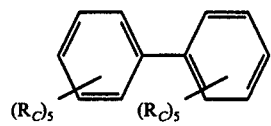

(III)

wherein each $R_C$ may represent either a hydrogen, chlorine or bromine atom with at least one, and preferably at least two, chlorine or at least two bromine atoms on each aromatic ring.

Examples of Group III aromatic halides include 2,2',4,4',6,6'-hexachlorobiphenyl, 2,2',4,4',6,6'-hexabromobiphenyl, and the like.

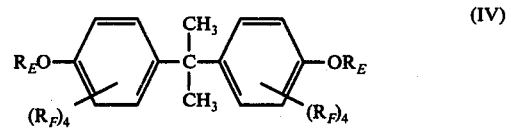

(IV)

wherein each $R_E$ may represent either a hydrogen, acetate, or methyl group; each $R_F$ may represent either a hydrogen, chlorine, or bromine atom with at least one, and preferably at least two, chlorine or at least two bromine atoms on each aromatic ring.

Examples of Group IV aromatic halides include 2,2-bis(3,5-dibromo 4-hydroxyphenyl) propane, 2,2-bis(3,5-dichloro 4-acetoxyphenyl) propane, 2,2-bis(3,5-dichloro 4-methoxyphenyl) propane, and the like.

Group Vb compounds useful in the present invention include compounds containing phosphorus, arsenic, antimony or bismuth. Preferred Group Vb compounds are the oxides of the Group Vb metals. Antimony trioxide is a particularly preferred Group Vb compound.

The aromatic halide and Group Vb metal containing compound may be incorporated in the molding resins of the present invention in any standard manner. It is preferred, however, that they be added during the polymerization reaction and prior to the introduction of the reinforcing agent.

The polycarbodiimides which may be used in the present invention may be selected from a particularly defined group. Not all polycarbodiimides will increase the impact strength of reinforced polyalkylene terephthalates when reacted with the polyalkylene terephthalate. On the contrary, it has been found that only those polycarbodiimides which both (a) are derived from at least one aromatic diisocyanate which is either unsubstituted or contains up to one methyl substituent on each aromatic ring, and (b) contain at least two carbodiimide units per polycarbodiimide molecule will achieve the desired result.

Aromatic diisocyanates which are more heavily substituted result in polycarbodiimides which are not sufficiently reactive to provide the desired rate of reaction with the polyalkylene terephthalate.

The polycarbodiimide should be such that it is miscible with the polyalkylene terephthalate which is in the molten state. The polycarbodiimides useful in the present invention may have number average molecular weights of generally from about 300 to about 10,000, typically from about 800 to about 8,000, and preferably from about 1,000 to about 6,500. Polycarbodiimides having molecular weights greater than about 10,000 may not dissolve in the polyalkylene terephthalate melt and thus may not be useful in the present invention.

Specific examples of polycarbodiimides which are useful in the present invention include poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly (3,3'-dimethyl-4,4'-diphenylmethane carbodiimide), and mixtures thereof. Preferred polycarbodiimides include poly (tolyl carbodiimide), poly (4,4'-diphenylmethane carbodiimide) and mixtures thereof.

The polycarbodiimides may be formed in any manner known to those skilled in the art, for example, by heating the aromatic diisocyanate compounds difined above in the presence or absence of solvent. The formation of the polycarbodiimide is accompanied by the evolution of carbon dioxide gas.

Although the polycarbodiimides useful in the present invention may be prepared without the use of a catalyst, much higher temperatures (ca. 300° C) are needed in the absence of a catalyst. For certain polycarbodiimides, the use of such high temperatures may result in the formation of large quantities of side products and colored products. Thus, the polycarbodiimides may be typically prepared by heating the isocyanates in the presence of a catalyst such as the phosphorus containing catalysts described in U.S. Pat. Nos. 2,853,473; 2,663,737, and 3,755,242, and also in Monagle, J. Org. Chem. 27, 3851 (1962). Phospholine oxides such as those described in Campbell et al, J. Amer. Chem. Soc. 84, 3673 (1962) are preferred catalysts. A particularly preferred catalyst is 1-ethyl-3-methyl-3-phospholine 1-oxide.

The polycarbodiimide formation reaction is preferably carried out under an atmosphere of argon or other dry inert gas so as to minimize the amount of water which may be in contact with the reactants since isocyanates tend to react rapidly with water at elevated temperatures.

Aromatic diisocyanates which may be used in preparing the desired polycarbodiimides include, for example, toluene diisocyanate, 4,4'-diphenylmethane diisocyanate, 3,3'-dimethyl-4,4'-biphenylene diisocyanate, p-phenylene diisocyanate, m-phenylene diisocyanate, 3,3'-dimethyl-4,4'-diphenylmethane diisocyanate and mixtures thereof.

Preferred aromatic diisocyanates are toluene diisocyanate, 4,4'-diphenylmethane diisocyanate, and mixtures thereof.

The aromatic diisocyanates are preferably employed in an essentially pure state but may contain minor amounts (i.e., less than about 2% by weight) of other compounds such as ureas, amines, and traces of water and/or acid. The term "toluene diisocyanate" is meant to include 2,4-toluene diisocyanate, 2,6-toluene diisocyanate, or any combination of these isomers. Mixtures of the 2,4- and 2,6- isomers typically contain either 80 parts by weight 2,4-toluene diisocyanate and 20 parts by weight 2,6-toluene diisocyanate or 65 parts by weight 2,4-toluene diisocyanate and 35 parts by weight 2,6-toluene diisocyanate.

Aromatic monoisocyanates may also be used in conjunction with the aromatic diisocyanates in the preparation of the polycarbodiimides which are employed in the process of the present invention. These monoisocyanates help control the molecular weight and viscosity of the resulting polycarbodiimides. The amount of aromatic monoisocyanates used depends upon the particular diisocyanate employed, but generally from about 1.5 to about 70, typically from about 2.0 to about 50, and preferably from about 2.5 to about 40% by weight of the monoisocyanate and correspondingly generally from about 30 to about 98.5, typically from about 50 to about 98, and preferably from about 60 to about 97.5% by weight of diisocyanate based upon the total weight of the isocyanate compounds may be employed.

Aromatic monoisocyanates which may be used in this way include, for example, p-chlorophenyl isocyanate, m-chlorophenyl isocyanate, phenyl isocyanate, p-methoxyphenyl isocyanate, m-methoxyphenyl isocyanate, p-tolyl isocyanate, m-tolyl isocyanate, o-tolyl isocyanate, p-nitrophenyl isocyanate, m-nitrophenyl isocyanate, 2,6-diethylphenyl isocyanate, and mixtures thereof.

Phenyl isocyanate, p-chlorophenyl isocyanate, m-chlorophenyl isocyanate and mixtures thereof are preferred monoisocyanates for use in the present invention.

Monoisocyanates alone may not be used to prepare the polycarbodiimides since polymeric carbodiimides would not result from the heating of monoisocyanates alone.

The reinforcing agents utilized in the present invention provide increased strength to the molded product.

The reinforcing agents which may be used include among others, glass fibers (chopped or continuous rovings), asbestos fibers, cellulosic fibers, synthetic fibers, including graphite fibers, acicular calcium metasilicate, and the like. The preferred glass reinforcing fibers are commercially available under the designation E glass (lime-aluminoborosilicate glass) and S glass (magnesium aluminosilicate glass). These are available in continuous length having a round cross section and a diameter of about 20 microns.

Mixtures of reinforcing agents may also be used.

The relative amounts of polyalkylene terephthalate, polycarbodiimide, and reinforcing agent may vary widely although there may be employed generally from about 40 to about 85, typically from about 50 to about 80, preferably from about 60 to about 75% by weight polyalkylene terephthalate, generally from about 0.1 to about 5, typically from about 0.2 to about 4, preferably from about 0.3 to about 3% by weight polycarbodiimide, and generally from about 15 to about 60, typically from about 20 to about 50, and preferably from about 25 to about 40% by weight reinforcing agent.

Amounts of reinforcing agent in excess of about 60% by weight result in processing difficulties whereas amounts of reinforcing agent less than about 15% by weight result in a lower flexural modulus and a lower heat deflection temperature.

The use of amounts of polycarbodiimide less than about 0.1% by weight results in little or no improvement in the impact strength of the molding resin composition whereas the use of amounts of polycarbodiimide in excess of about 5% by weight result in an increase of the viscosity of the blend so as to render processing difficult.

Other additives, both polymeric and non-polymeric, such as lubricity agents, dyes, plasticizers, hardeners, stabilizers, antioxidants, and inorganic fillers may be employed as long as these additives do not interfere with the reaction between the polycarbodiimide and the polyalkylene terephthalate. Such additives may generally be present in amounts of up to about 3% by weight of the total composition.

The polyalkylene terephthalate, polycarbodiimide, and reinforcing agent may be blended in any convenient manner so long as the polycarbodiimide is in contact with the polyalkylene terephthalate while it is in the molten state for a period of time sufficient for chemical reaction to occur. The ingredients may be dry blended or melt blended, blended in extruders, heated rolls, or other types of mixers. If desired, the reinforcing agent may be blended with the polyalkylene terephthalate and polycarbodiimide during their chemical reaction so long as the chemical reaction is not affected. The following illustrate several methods of blending the polyalkylene terephthalate, polycarbodiimide, and reinforcing agent. A physical blend of polyalkylene terephthalate pellets, polycarbodiimide, and reinforcing agent may be prepared and charged directly into a melt screw extruder such as a Werner-Pfleiderer ZSK twin screw extruder. This method may be disadvantageous, however, since the polyalkylene terephthalate pellets in their initial solid state may tend to cause breakdown of the reinforcing agent (e.g., the glass fibers). A preferred method of blending the polyalkylene terephthalate, polycarbodiimide and reinforcing agent is to charge the polyalkylene terephthalate pellets to the hopper of the extruder and add the polycarbodiimide and reinforcing agent downstream in the extruder (e.g., in the vent port or other side feed port of the extruder). The advantage of this method is that by the time the polyalkylene terephthalate pellets have reached the place in the extruder where the polycarbodiimide and reinforcing agent are to be added (e.g., the vent port), the pellets have become molten and thus will result in minimal attrition of the reinforcing agent.

Another method of blending the polyalkylene terephthalate, polycarbodiimide and reinforcing agent is to first react the polyalkylene terephthalate and polycarbodiimide in a plastograph and then add the reinforcing agent to the polycarbodiimide modified polyalkylene terephthalate. However, the reaction of the polyalkylene terephthalate with the polycarbodiimide results in an increase in the melt viscosity of the polyalkylene terephthalate and this melt viscosity increase tends to result in attrition of the reinforcing agent when it is subsequently added.

The present process may be carried out at any temperature which is such that the polyalkylene terephthalate will remain in the molten state for a period of time sufficient to enable reaction between the polyalkylene terephthalate and the polycarbodiimide to take place. The reaction temperature should be high enough so that the polyalkylene terephthalate is in a molten state but not so high as to decompose the polyalkylene terephthalate or polycarbodiimide. At atmospheric pressure, the reaction may be carried out at temperatures of generally from about 220° to about 300°, typically from about 225° to about 275°, and preferably from about 230° to about 260° C.

Although pressures may vary widely, and subatmospheric, atmospheric and superatmospheric pressures may be used, substantially atmospheric pressure is preferred.

The molten polyalkylene terephthalate and the polycarbodiimide must be in contact for a sufficient time for chemical reaction to take place. The progress of the reaction may be monitored by observing the decrease in carboxylic acid end groups (CEG) of the polyalkylene terephthalate with time. When no further decrease in CEG takes place, reaction has ceased. Of course, reaction time is a function of temperature, but in the present process, a reaction time of generally from about 1 to about 7, typically from about 1.25 to about 6.8, and preferably from about 1.5 to about 6.5 minutes (melt screw extruder) is usually sufficient to obtain the desired product. Because mixing does not take place to as great a degree in a plastograph as in a melt screw extruder, reaction times in the plastograph are generally somewhat longer.

The process of the present invention may, of course, be carried out in a batch, continuous, or semi-continuous basis as desired.

The present invention is further illustrated by the following examples. All parts and percentages in the examples as well as in the specification and claims are by weight unless otherwise specified.

EXAMPLE I

This example illustrates the preparation and physical properties of both glass reinforced polybutylene terephthalate, i.e., the reaction product of tetramethylene glycol and dimethyl terephthalate, and the glass reinforced reaction product of polybutylene terephthalate and poly(tolyl carbodiimide).

Runs 1 and 2 illustrate the properties associated with the glass reinforced reaction product of polybutylene terephthalate and poly(tolyl carbodiimide). Runs 1 and 2 further illustrate the effect on the physical properties of the reinforced product of using varying levels of polycarbodiimide to modify the polybutylene terephthalate. Run 3 illustrates the properties associated with glass reinforced unmodified polybutylene terephthalate pellets.

In each case the polybutylene terephthalate used has an intrinsic viscosity of 0.75 and comprises 1/16 inch by 1/18 inch pellets which have been dried at 130° C for three hours in a vacuum oven. The glass reinforcing agent is Owens Corning 419 3/16 inch chopped strand glass.

In each case the polybutylene terephthalate and glass fibers are added through the hopper of a 28 millimeter Werner-Pfleiderer ZSK twin screw melt extruder having the following screw configuration:

| Pitch | 15, | 45, | 45, | 30, | 30, | 30, | 24, | 24, | 24, | 24, | 24, | 30 |
|---|---|---|---|---|---|---|---|---|---|---|---|---|
| Segment Length | 15, | 45, | 45, | 60, | 60, | 60, | 48, | 48, | 48, | 48, | 48, | 30 |
| Pitch | 45, | 45, | 24, | 24, | 24, | 24, | 30, | 30 | | | | |
| Segment Length | 45, | 45, | 24, | 24, | 24, | 24, | 30, | 30 | | | | | at 490° F (100 RPM) and at atmospheric pressure. In runs 1 and 2, a polycarbodiimide is also added to the hopper of the extruder; in run 3 no polycarbodiimide is employed.

Tensile and impact bars are molded in a 2½ ounce Stubbe screw injection machine under the molding conditions listed below in Table I:

Table I

| Run No. | 1 | 2 | 3 |
|---|---|---|---|
| Processing Temperature (° F) | 490 | 490 | 490 |
| Mold Temperature (° F) | 150 | 150 | 150 |
| Injection Pressure (psi) | 13,000 | 13,000 | 7,000 |
| Total Cycle Time (seconds) | 30 | 30 | 30 |
| Screw Speed (RPM) | 75 | 75 | 75 |

The molding composition is heated in the injection chamber of the molding machine. The material is then injected either by plunger or reciprocating screw under high pressure and in hot, fluid form into a relatively cold closed mold. After a short cooling cycle, the molded part is solidified to a degree sufficient to enable the part to be ejected from the mold without distortion.

The properties of these glass reinforced polybutylene terephthalate compositions are summarized in Table II below:

TABLE II

| Run No. | 1 | 2 | 3 |
|---|---|---|---|
| Tensile strength, psi | 18,200 | 17,700 | 17,400 |
| Tensile Modulus, $10^6$, psi | 1.25 | 1.31 | 1.28 |
| Elongation, % | 3.3 | 3.4 | 2.8 |
| Flex Str., psi | 27,800 | 28,400 | 26,200 |
| Flex Modl., $10^6$ psi | 1.14 | 1.12 | 1.16 |
| Izod (notched)ft-lb/in | 2.0 | 2.0 | 1.4 |
| (reverse notch) | 13.4 | 12.9 | 10.3 |
| (un-notched) | 19.7 | 19.8 | 14.1 |
| Gardner Impact (on T-Bar) | | | |
| (gated end) in-lb | 7.5 | 6.5 | 4.1 |
| (non-gated end) | 9.0 | 9.8 | 4.4 |
| Rockwell Hardness (M) | 88 | 88 | 91 |
| HDT, 264 psi ° C | 201 | 201 | 204 |
| Composition: | | | |
| PBT (0.75 I.V.) | 70% | 70% | 70% |
| Glass (O.C. 419; 3/16") | 30% | 30% | 30% |
| Poly (tolyl carbodiimide) | 1% based on PBT or 0.7% of composite | 2% based on PBT or 1.4% of composite | — |

The products produced in runs 1 and 2 are slightly yellower than that produced in run 3.

The results summarized in Table II indicate that the addition of poly(tolyl carbodiimide) at a level of from about 0.7 to about 1.4% by weight based on the total weight of the composition significantly improves the impact strength of glass reinforced polybutylene terephthalate with a modest increase in the tensile and flexural strengths. For example, glass reinforced poly(tolyl carbodiimide) modified polybutylene terephthalate resin compositions (i.e., runs 1 and 2) have an impact strength as measured by notched Izod of more than 40% greater than glass reinforced polybutylene terephthalate which is not so modified (i.e., runs 3).

Example II

This example illustrates the preparation and physical properties of both glass reinforced polybutylene terephthalate, i.e., the reaction product of tetramethylene glycol and dimethyl terephthalate, and the glass reinforced reaction product of polybutylene terephthalate and poly (4,4'-diphenylmethane carbodiimide).

Runs 4 and 5 illustrate the properties associated with the glass reinforced reaction product of polybutylene terephthalate and poly(4,4'-diphenylmethane carbodiimide). Runs 4 and 5 further illustrate the effect on the physical properties of the reinforced product of using varying levels of polycarbodiimide to modify the polybutylene terephthalate. Run 6 illustrates the properties associated with glass reinforced unmodified polybutylene terephthalate pellets.

The polybutylene terephthalate pellets and the glass reinforcing agent used in these runs are the same as those used in runs 1 to 3. The materials are blended in the same way as in Example I. The tensile and impact bars are prepared as in Example I and the molding conditions are as indicated below in Table III:

Table III

| Run No. | 4 | 5 | 6 |
|---|---|---|---|
| Processing Temperature (° F) | 490 | 510 | 490 |
| Mold Temperature (° F) | 150 | 150 | 150 |
| Injection Pressure (psi) | 13,500 | 17,000 | 7,500 |
| Total Cycle Time (seconds) | 22 | 42 | 22 |

Table III-continued

| Run No. | 4 | 5 | 6 |
|---|---|---|---|
| Screw Speed (RPM) | 80 | 80 | 80 |

The properties of these glass reinforced polybutylene terephthalate compositions are summarized in Table IV below:

Table IV

| Run No. | 4 | 5 | 6 |
|---|---|---|---|
| Tensile Strength, psi | 17,800 | 17,200 | 18,000 |
| Tensile Modulus, $10^6$ psi | 1.26 | 1.21 | 1.28 |
| Elongation, % | 3.7 | 4.0 | 3.0 |
| Flex Strength, psi | 28,100 | 28,100 | 27,600 |
| Flex Modulus, $10^6$ psi | 1.23 | 1.13 | 1.13 |
| Izod (notched) ft-lb/in | 2.1 | 2.5 | 1.4 |
| (reverse notch) | 14.3 | 14.1 | 11.3 |
| (un-notched) | 22.1 | 21.4 | 17.3 |
| Gardner impact (on T-Bar) | | | |
| (gated end) in-lb | 5.0 | 7.8 | 4.5 |
| (non-gated end) | 9.8 | 17.5 | 6.3 |
| Rockwell Hardness (M) | 89 | 69 | 89 |
| HDT, 264 psi° C | 204 | 200 | 205 |
| Specific Gravity | 1.54 | — | — |
| Composition: | | | |
| PBT (0.75 l. V.) | 69.5% | 69% | 70% |
| Glass (O.C. 419; 3/16") | 30% | 30% | 30% |
| Poly(4,4'-diphenylmethane carbodiimide) | 0.8% based on PBT or 0.55% of composite | 1.6% based on PBT or 1.1% of composite | — |

These runs indicate that the glass reinforced poly (4,4-diphenylmethane carbodiimide) modified polybutylene terephthalate resin compositions (i.e., runs 4 and 5) have greater impact strength (more than a 50% increase in impact strength as measured by notched Izod) than glass reinforced polybutylene terephthalate which is not so modified (i.e., run 6). The increase in impact strength of the poly(4,4'-diphenylmethane carbodiimide) modified polybutylene terephthalate compositions also does not result in an appreciable decrease in other physical properties such as tensile strength or flexural strength.

EXAMPLE III

This example illustrates the preparation of a polycarbodiimide which is used in the preparation of glass reinforced polycarbodiimide modified polybutylene terephthalate. The particular polycarbodiimide used is the reaction product of an aromatic diisocyanate and an aromatic monoisocyanate.

A 500 milliliter resin reaction flask is fitted with a gas inlet tube, magnetic stirrer bar, and a condenser (graham spiral loop) at the top of which the gas inlet tube leads to a bubbler for observing gas evolution. Toluene diisocyanate (105 grams), p-chlorophenyl isocyanate (62.1 grams) and bis($\beta$-chloroethyl) vinyl phosphonate (13 grams) are added to the flask. The bis($\beta$-chloroethyl) vinyl phosphonate is commercially available from the Stauffer Chemical Co. under the trade name Fyrol Bis Beta and is used as a catalyst in the present reaction.

Argon is passed copiously over the surface of the reactants. The flask containing the reactants is lowered into an oil bath at about 190° C (internal reaction temperature of between about 170° and 180° C). Argon is continuously passed over the reactants at a slow rate while the reaction is taking place.

Within minutes after immersion, bubbles of carbon dioxide may be observed by the clouding of a lime water solution. The reaction is continued for about 4 hours until a foamed material forms in the flask. Heating is continued for an additional period of time until the foam fills most of the flask. Argon is passed rapidly over the surface during this period. Heating is then stopped and the flask is allowed to cool under an argon atmosphere. The reaction vessel containing the product is then weighed and a loss of about 20% is observed. The foamed material is quite friable and is readily chipped out. The remaining deep red material may also be chipped out or removed by softening with acetone. The product shows a small peak in the infra red (IR) for isocyanate (4.4µ), a large peak for carbodiimide (4.7µ), and a substantial peak which is probably polymerized carbodiimide (6.0µ). The carbodiimide and polymerized carbodiimide combined material comprise about 90 to 95% of the product.

This product is further purified by heating under vacuum in an oil bath at 205° C for 2½ hours. Loss in weight is variable with about 15% of the material being removed. The final product shows no isocyanate by IR. Purification also appears to remove virtually all of the catalyst since phosphorus levels are less than 0.1%.

The polycarbodiimide product is blended with polybutylene terephthalate and glass fibers in a manner similar to that of run 1 of Example I and similar results are achieved.

EXAMPLE IV

Example I is repeated with the exception that an equimolar quantity of trimethylene glycol is substituted for the tetramethylene glycol in the formation of the polyalkylene terephthalate polymer. Substantially similar results are achieved.

COMPARATIVE EXAMPLE I

This example illustrates the effect of modifying glass reinforced polybutylene terephthalate, i.e., the reaction product of tetramethylene glycol and dimethyl terephthalate, compositions with a highly substituted polycarbodiimide (run 7).

The amounts, reaction conditions, apparatus, and molding conditions are the same as in run 1 of Example I but instead of using poly(tolyl carbodiimide), there is employed poly(2,6-diisopropyl-1,3-phenylene carbodiimide) (a highly substituted polycarbodiimide).

The results of this run are summarized in Table V below:

Table V

| Run No. | 7 |
|---|---|
| Tensile strength, psi | 16,240 |
| Tensile Modulus, 106, psi | 1.27 |
| Elongation, % | 2.7 |
| Flex Str., psi | 26,460 |
| Flex. Modl., 10⁶, psi | 1.10 |
| Izod (notched) ft-lb/in | 1.4 |
| Gardner Impact (on T-Bar) | |
| (gated end) in-lb | 3.25 |
| (non-gated end) | 6.5 |
| Rockwell Hardness (M) | 89 |
| HDT, 264 psi ° C | 199 |
| Composition (%): | |
| PBT (0.75 I.V.) | 69.3 |
| Glass (O.C. 419; 3/16") | 29.7 |
| Polycarbodiimide Amount | 1.04 |

COMPARATIVE EXAMPLE II

A monocarbodiimide (p-chlorophenyl carbodiimide) is employed using the amounts, reaction conditions, and molding conditions as in run 7. No substantial improvement in impact strength takes place.

The principle, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. In a process for producing a reinforced polyalkylene terephthalate molding resin composition comprising intimately mixing in the molten state a reinforcing agent with a polyalkylene terephthalate polymer which is the reaction product of terephthalic acid or a dialkyl ester of terephthalic acid and a glycol selected from the group consisting of trimethylene glycol, tetramethylene glycol, and mixtures thereof, said polyalkylene terephthalate having an intrinsic viscosity of from about 0.2 to about 1.2 deciliters per gram, the improvement comprising
    modifying said polyalkylene terephthalate polymer by reacting the polyalkylene terephthalate polymer in the molten state with at least one polycarbodiimide, which polycarbodiimide both
        (1) is derived from at least one aromatic diisocyanate which is either unsubstituted or contains up to one methyl substituent on each aromatic ring, and
        (2) contains at least two carbodiimide units per polycarbodiimide molecule,
    whereby said resulting molding resin composition exhibits a substantially improved impact strength.

2. The process of claim 1 wherein said reaction between the polycarbodiimide and the polyalkylene terephthalate polymer takes place simultaneously with the mixing of the polyalkylene terephthalate polymer and the reinforcing agent.

3. The process of claim 1 wherein there is employed from about 0.1 to about 5% by weight polycarbodiimide, from about 40 to about 85% by weight polyalkylene terephthalate, and from about 15 to about 60% by weight reinforcing agent based upon the total weight of the reinforced resin composition.

4. The process of claim 2 wherein said reaction is carried out at a temperature of from about 220° to about 300° C and at substantially atmospheric pressure.

5. The process of claim 4 wherein said polycarbodiimide may be selected from the group consisting of poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide) and mixtures thereof.

6. The process of claim 5 wherein the reinforcing agents may be selected from the group consisting of glass fibers, asbestos fibers, cellulosic fibers, synthetic fibers, and mixtures thereof.

7. In a process for producing a reinforced polyalkylene terephthalate molding resin composition comprising intimately mixing in the molten state from about 20 to about 50% by weight of a reinforcing agent with from about 50 to about 80% by weight of a polyalkylene terephthalate polymer which is the reaction product of terephthalic acid or a dialkyl ester of terephthalic acid and a glycol selected from the group consisting of trimethylene glycol, tetramethylene glycol, and mixtures thereof, said polyalkylene terephthalate having an intrinsic viscosity of from about 0.5 to about 1.0 deciliters per gram, the improvement comprising modifying said polyalkylene terephthalate polymer by reacting said polymer in the molten state with from about 0.2 to about 4% by weight of at least one polycarbodiimide, which polycarbodiimide both
(1) is derived from at least one aromatic diisocyanate which is either unsubstituted or contains up to one methyl substituent on each aromatic ring, and
(2) contains at least two carbodiimide units per polycarbodiimide molecule, whereby said resulting molding resin composition exhibits a substantially improved impact strength.

8. The process of claim 7, wherein the reaction between the polycarbodiimide and the polyalkylene terephthalate polymer takes place simultaneously with the mixing of the polyalkylene terephthalate polymer and the reinforcing agent.

9. The process of claim 7 wherein said polycarbodiimide may be selected from the group consisting of poly(tolyl carbodiimide), poly(4,4'-diphenylmethane carbodiimide), poly(3,3'-dimethyl-4,4-biphenylene carbodiimide), poly(p-phenylene carbodiimide), poly(m-phenylene carbodiimide), poly(3,3'-dimethyl-4,4'-diphenylmethane carbodiimide) and mixtures thereof, said reinforcing agent may be selected from the group consisting of glass fibers, asbestos fibers, cellulosic fibers, synthetic fibers, and mixtures thereof, and wherein said reaction is carried out at a temperature of from about 225° to about 275° C and at substantially atmospheric pressure.

10. In a process for producing a reinforced polyalkylene terephthalate molding resin composition comprising intimately mixing in the molten state from about 25 to about 40% by weight of a reinforcing agent with from about 60 to about 75% by weight of a polyalkylene terephthalate polymer which is the reaction product of terephthalic acid or a dialkyl ester of terephthalic acid and a glycol selected from the group consisting of trimethylene glycol, tetramethylene glycol, and mixtures thereof, said polyalkylene terephthalate having an intrinsic viscosity of from about 0.5 to about 1.0 deciliters per gram, the improvement comprising modifying said polyalkylene terephthalate polymer by reacting said polymer in the molten state with from about 0.3 to about 3% by weight of at least one polycarbodiimide selected from the group consisting of poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide), and mixtures thereof
at a temperature of from about 230° to about 260° C and at substantially atmospheric pressure
whereby said resulting molding resin composition exhibits a substantially improved impact strength.

11. A reinforced polycarbodiimide modified polyalkylene terephthalate molding resin composition having improved impact strength, said resin comprising a reinforcing agent intimately admixed with the reaction product of
(a) a polyalkylene terephthalate polymer which is the reaction product of terephthalic acid or a dialkyl ester of terephthalic acid and a glycol selected from the group consisting of trimethylene glycol, tetramethylene glycol, and mixtures thereof, said polyalkylene terephthalate having an intrinsic viscosity of from about 0.2 to about 1.2 deciliters per gram, and
(b) a polycarbodiimide which both
(1) is derived from at least one aromatic diisocyanate which is either unsubstituted or contains up to one methyl substituent on each aromatic ring, and
(2) contains at least two carbodiimide units per polycarbodiimide molecule.

12. The reinforced polycarbodiimide modified polyalkylene terephthalate molding resin composition of claim 11 wherein there is employed from about 15 to about 60% by weight reinforcing agent based upon the total weight of the reinforced resin composition.

13. The reinforced polycarbodiimide modified polyalkylene terephthalate molding resin composition of claim 12 wherein said reinforcing agent is glass fibers.

14. The reinforced polycarbodiimide modified polyalkylene terephthalate molding resin composition of claim 12 wherein said reinforcing agent is acicular calcium metasilicate.

15. The reinforced polycarbodiimide modified polyalkylene terephthalate molding resin composition of claim 13 wherein said polyalkylene terephthalate polymer is polybutylene terephthalate having an intrinsic viscosity of from about 0.5 to about 1.0 deciliters per gram.

16. The reinforced polycarbodiimide modified polyalkylene terephthalate molding resin composition of claim 11 wherein said polycarbodiimide is selected from the group consisting of poly(tolyl carbodiimide), poly(4,4'-diphenylmethane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenylmethane carbodiimide) and mixtures thereof.

17. The reinforced polycarbodiimide modified polyalkylene terephthalate molding resin composition of claim 16 wherein said reinforced polycarbodiimide modified polyalkylene terephthalate composition comprises from about 0.1 to about 5% by weight polycarbodiimide, from about 40 to about 85% by weight polyalkylene terephthalate polymer, and from about 15 to about 60% by weight reinforcing agent based upon the total weight of the reinforced resin composition.

18. A reinforced polycarbodiimide modified polyalkylene terephthalate molding resin composition comprising from about 20 to about 50% by weight of a reinforcing agent intimately admixed with the reaction product of (a) from about 50 to about 80% by weight of a polyalkylene terephthalate polymer which is the reaction product of terephthalic acid or a dialkyl ester of terephthalic acid and a glycol selected from the group consisting of trimethylene glycol, tetramethylene glycol, and mixtures thereof, said polyalkylene terephthalate having an intrinsic viscosity of from about 0.5 to about 1.0 deciliters per gram, and (b) from about 0.2 to about 4% by weight of a polycarbodiimide selected from the group consisting of poly(tolyl carbodiimide), poly (4,4'-diphenylmethane carbodiimide), and mixtures thereof.

19. The reinforced polycarbodiimide modified polyalkylene terephthalate molding resin composition of claim 18 wherein said reinforcing agent is glass, said polyalkylene terephthalate polymer is polybutylene terephthalate, and said polycarbodiimide is poly(4,4'-diphenylmethane carbodiimide).

* * * * *